(12) United States Patent
Faist et al.

(10) Patent No.: US 8,490,170 B2
(45) Date of Patent: Jul. 16, 2013

(54) INTERNET-BASED FILL-LEVEL MEASUREMENT VALUE AND DIAGNOSTIC INFORMATION POLLING SYSTEM

(75) Inventors: Fridolin Faist, Oberwolfach (DE); Martin Wettlin, Schiltach (DE)

(73) Assignee: VEGA Grieshaber KG, Wolfach (DE)

( * ) Notice: Subject to any disclaimer, the term of this patent is extended or adjusted under 35 U.S.C. 154(b) by 217 days.

(21) Appl. No.: 13/196,344

(22) Filed: Aug. 2, 2011

(65) Prior Publication Data

US 2012/0198540 A1  Aug. 2, 2012

Related U.S. Application Data (60) Provisional application No. 61/372,970, filed on Aug. 12, 2010.

(30) Foreign Application Priority Data

Aug. 12, 2010  (EP) .................................... 10172682

(51) Int. Cl.
*G06F 17/30* (2006.01)
(52) U.S. Cl.
USPC ...................................... 726/10; 726/5; 726/3
(58) Field of Classification Search
None
See application file for complete search history.

(56) References Cited

U.S. PATENT DOCUMENTS

| 2005/0165734 A1* | 7/2005 | Vicars et al. ....................... 707/2 |
| 2006/0230282 A1* | 10/2006 | Hausler .......................... 713/182 |
| 2008/0172417 A1 | 7/2008 | Oehler et al. |
| 2011/0264430 A1* | 10/2011 | Tapscott et al. ................. 703/10 |

FOREIGN PATENT DOCUMENTS

DE  10 2007 002 351  7/2008

OTHER PUBLICATIONS

Grafinkel et al., "Web Security, Privacy and Commerce"; Ch. 20: Controlling Access to your Web Content, pp. 533-549 XP-002623651, year 2002.
Itschner et al, "GLASS: Remote Monitoring of Embedded Systems in Power Engineering", IEEE Internet Computing, May-Jun. 1998, pp. 46-52.

* cited by examiner

*Primary Examiner* — David Y Jung
(74) *Attorney, Agent, or Firm* — Fay Kaplun & Marcin, LLP (57) ABSTRACT

An Internet-based fill-level measurement value and diagnostic information polling system includes several field devices, a central server and a processing unit that is connected to the server by way of the internet. In response to a user inquiry the server generates a certificate and an associated data object that characterizes the data that may be polled by the user. In response to an inquiry by the user, with which inquiry the certificate is sent along to the server, the server automatically transmits the requested data to the user if a check of the certificate shows that the user is authorized to receive this.

12 Claims, 6 Drawing Sheets

| Plant operator | Home >> Plant operator |
| --- | --- |
| Device networks | |
| Administrators | |
| User accounts | |
| Messages/ events | |
| | |
| Online help editor | |

| Plant operator | | Edit | | Add | | Filter | | Apply |
| --- | --- | --- | --- | --- |
| Name | Contact |
| Company A | John Smith |
| Company B | John Smith |
| Company C | John Smith |
| Company D | John Smith |
| Company E | John Smith |
| Company F | John Smith |
| Company G | John Smith |
| Company H | John Smith |

Fig. 3

| Projects | Home >> Plant operator  << Projects |
| --- | --- |
| Device networks | Plant operator |
| User accounts | Company A |
| E-mail configuration | |
| SMS configuration | |
| Fax configuration | |
| Plant operator data | |
| Layout | |
| External system integration | |

| Projects | | Add | | Filter | | Apply |
| --- | --- | --- | --- |
| Name | Contact |
| Plant East | Mr Sample |
| Plant West | Mr Sample |
| Plant X | Mr Sample |

Fig. 4

| Projects | Home >> Plant operator  << User accounts |
| --- | --- |
| Device networks | Plant operator |
| User accounts | Company A |
| E-mail configuration | |
| SMS configuration | |
| Fax configuration | |
| Plant operator data | |
| Layout | |
| External system integration | |

| User accounts | | Edit | | Add | | Filter | | Apply |
| --- | --- | --- | --- | --- |
| User | Projects |
| User account 1 | Plant West |
| User account 2 | |
| User account 3 | Plant East, Plant X |
| User account 4 | Plant X |
| User account 5 | Plant East |
| User account 6 | Plant West, Plant East |
| User account 7 | |
| User account 8 | |

Fig. 5

|  | Home >> Plant operator  << External system integration |
|---|---|
| External system integration | Plant operator: Company A |

| External system integration | ☐ Add | 🔽 Filter | | Apply |
|---|---|---|---|---|
| | | | Date of expiry of certificate | |
| Access for client A | | | 01.01.2015 | |
| Access for client B | | | 01.01.2015 | |
| Access for client C | | | 01.01.2010 | |

Fig. 6

| Plant operator: Company A | |
|---|---|

| External system integration - Data access | ⬅ Back  ➡ Continue ✗ Quit |
|---|---|
| Name | Access for client A |
| Time period | Current values  🔽 |
| Type(s) of measured values | ☑ %     ☑ Sensor value<br>☐ Scaled value  ☐ Lin % |
| Empty volume | ☐ |
| Alarm thresholds | ☐ |

⦿ Plant operator - Structure
○ Device networks

☐☑ Company A ———————————— Plant operator
   ☐☑ Plant West ———————————— Project
      ☐☑ Rye silo ———————————— Measured-value view
      ☐☑ Sugar silo ———————— Measuring point
         ☐☑ Top sugar measuring point
         ☐☑ Bottom sugar measuring point
      ☐☑ Water silo ———————————— Location
         ☐☑ Water measuring point
      ☐☑ Wheat store
         ☐☑ Wheat silo
   ☐☑ Plant East

| | Home >> Plant operator << External system integration | |
|---|---|---|
| External system integration | Plant operator: Company A | External system integration Access for client A |
| Messages | External system integration | ☐ Download web service client    ☑ Edit    ✕ Delete |
| | Name | Access for client A |
| | Description | Definition of access rights for remote display at client A |
| | External system integration activated | |
| | Time period | Current values |
| | Type(s) of measured values | |
| | Certificate information | |
| | ID | 0815 |
| | Date of expiry | 01.01.2015 |
| | Prepared on | 21.06.2010 |
| Log out | Last change | 21.06.2010 |

INTERNET-BASED FILL-LEVEL MEASUREMENT VALUE AND DIAGNOSTIC INFORMATION POLLING SYSTEM

PRIORITY CLAIM

This application claims the benefit of the filing date of EP Patent Application Serial No. EP 10 172 682.6 filed 12 Aug. 2010 and U.S. Provisional Patent Application Ser. No. 61/372,970 filed 12 Aug. 2010, the disclosure of these applications is hereby incorporated by reference.

FIELD OF INVENTION

The present invention relates to fill-level measurement value and diagnostic information polling systems. In particular, the invention relates to an internet-based fill-level measurement value and diagnostic information polling system, as well as to a method for using such an internet-based fill-level measurement value and diagnostic information polling system.

BACKGROUND INFORMATION

Filling levels of containers and silos may be determined automatically with the use of filling level sensors, and the measured values can be transmitted (conveyed), by way of field bus connections, to higher-order control systems or servers. Subsequently, within local networks or by way of corresponding internet connections, these measured values can be conveyed to a client computer where they can be displayed.

Either no mechanism for access control may be provided, or access control may take place on the server side by way of preparation of an individual user account for each data set that is to be retrievable by the client computers. In this arrangement, in the client computer in each instance of access a login to the user account may need to take place. However, usually the user accounts relate to altogether different aspects, namely the rights to manage entire projects; setting up measured value views; setting up notification actions; allocating devices to projects; etc.

There is thus a risk in that the operators of a client computer receive far more rights or authorizations than is necessary and sensible for the application case of pure data consumption. At the same time, on the server side the list of the defined user accounts may become unnecessarily long and complex.

The above may result in the mixing of thematically completely different tasks within the list of the user accounts. There may be a considerable danger of, for example, user accounts that originally were intended only for users with exclusive data consumption, at a later point in time as a result of a change in the settings of the user account, receiving unintended permission for modifying projects. There is also a further problem in that details of access authorization may be hidden in the user accounts and that even for the system administrator it is time-consuming and complex to ensure and understand which addressees already use automatic access to measured value information by way of client computers. There is also a further problem in that, in contrast to the situation relating to owners of user accounts, which owners usually have quite extensive insight into the project data, the consuming client computers frequently are to receive only the data of individual measuring points.

Thus, frequently a granular structure of access control at the level of measuring points may be required, which in turn may result in an considerable increase of the list of user accounts. In this context the term "granular" refers to a situation in which in the presence of a complex project structure (project with a large number of individual measuring points which in turn are multiply grouped and subdivided within the project) instances of access authorization to very "small units" (in other words for example only 1 or 2 measuring points) are made possible.

It should be pointed out again that a 1:1 linkage of a certificate with precisely one measuring point is not mandatory. While the aforesaid may exist, it is likewise provided for a certificate to be associated with a data object comprising several measuring points.

Furthermore, in the context of internet applications the use of proprietary transmission protocols has been shown to be problematic and expensive.

SUMMARY OF THE INVENTION

The present application relates to an internet-based fill-level measurement value and diagnostic information polling system and a method for the use of such an internet-based measurement value and diagnostic information polling system.

According to a first aspect of the present invention, an internet-based fill-level measurement value and diagnostic information polling system is stated that comprises a server, at least one first field device, and at least one processing unit, in the following also referred to as arithmetic unit. For conveying first measured values to the server, the first field device is communicatively connected to the server. For polling the first measured values from the server, the processing unit is communicatively connected to the server by way of the Internet. The system is designed to generate a first certificate (e.g. an X.509 certificate) and a first data object which is related or assigned to the first certificate upon receipt of an inquiry from the processing unit. This first data object makes it possible for the server to identify the first measured values of the first field device as being assigned to the first certificate, and the server is designed for automatic transmission, to the processing unit, of the data (in other words in particular of the measured values) assigned to the first certificate when said server receives a corresponding inquiry together with the first certificate from the processing unit.

In other words, the processing unit (and thus a user) can define, in the server, which data the server is to automatically make available to the processing unit upon receipt of a corresponding inquiry. Such data can relate to measured values and/or to diagnostic information data that is made available to the server by the corresponding field device. It is not necessary to prepare the data in the form of graphics on the server.

This may provide simple and secure access to measured data and diagnostic data of fill-level measuring devices.

This system may also be used for polling pressure measurement data or flow measurement data from field devices by a server.

The data object defines the maximum amount of data that is to be provided to the processing unit. This data may, for example, comprise all the measurement information and diagnostic information data that has been made available to the server by a certain selection of field devices that are connected to the server. Moreover, the data object may define that this data is limited in time; for example that it must relate at maximum to the data generated during the previous days, the previous weeks or the previous months. The data object is generated by the server together with the certificate; said data object describes all the data which the user (in future) may like to receive from the server.

If the server then receives an inquiry from the processing unit, which inquiry comprises information as to what data the processing unit (or the user respectively) would like to have transmitted, then the certificate must be transmitted together with this inquiry to the server. If checking the certificate shows that the processing unit is authorized to poll this data, the required data is automatically transmitted to the processing unit. It should be pointed out that the data object may relate to a larger quantity of data than actually requested from the server together with transmission of the certificate.

In other words, the user has the option of requesting less data than it could actually request and also receive, because said user is authorized to do so.

In this manner data traffic may be reduced to a minimum.

According to another exemplary embodiment of the invention, the system comprises a second field device that for conveying (i.e. transmitting) second measured values to the server is communicatively connected to the server, wherein the system is designed to generate a second certificate and a second data object, which is assigned to the second certificate, upon receipt of an inquiry from the processing unit. The second data object makes it possible for the server to identify the second measured values of the field device as being assigned to the second certificate. The server is designed for automatic conveyance of the data assigned to the second certificate or, if desired, for automatic conveyance of the second measured values to the processing unit when it has received a corresponding inquiry together with the second certificate from the processing unit.

In other words, the processing unit can request measured values and diagnostic-information polling data from various field devices, provided the certificate sent along correspondingly permits this.

According to a further exemplary embodiment of the invention, the server is designed to generate the first certificate and the first data object (and the second certificate and the second data object, etc.) following a request by the processing unit.

The user can thus determine the data to which it would like to have access in future, and can obtain a corresponding certificate from the server provided said user has corresponding user authorization on the server.

According to a further exemplary embodiment of the invention, the server is designed for managing the first certificate.

According to a further exemplary embodiment of the invention, the server is further designed for managing individual user accounts by way of which the processing unit can carry out parameterization of the first field device.

According to a further exemplary embodiment of the invention, the server is designed for managing the individual user accounts for providing a first user interface for a user of the processing unit. Furthermore, the server is designed for managing the certificate for providing a second user interface for a user of the processing unit. This can be the same user or some other user.

According to a further exemplary embodiment of the invention, it is solely the certificate received from the processing unit in the server, and thus the first data object assigned to the first certificate, that determines the extent of the data which is subsequently to be conveyed from the server to the processing unit.

In this case it may thus be sufficient if a user conveys his certificate to the server. Said user then automatically receives back the measuring information and/or the diagnostic information data assigned to the certificate.

According to a further exemplary embodiment of the invention, the first data object may furthermore make it possible for the server to identify diagnostic data of the first field device as being assigned to the first certificate.

According to a further exemplary embodiment of the invention, the first field device is a fill-level measuring device, in which case the corresponding data is fill-level measurement data and diagnostic data of the fill-level measuring device.

Furthermore, the field device can be a flow measurement device or a pressure measurement device.

According to a second aspect of the invention, a method for using an internet-based fill-level measurement value and diagnostic information polling system as described above and below is stated. First measured values are conveyed from a first field device to a server. Subsequently, upon receipt of an inquiry from the processing unit a first certificate and a first data object, which is assigned to the first certificate, is generated on the server side. By means of the first data object, identification of the first measured values of the first field device as being assigned to the first certificate takes place. After identification of the first measured values, automatic conveyance of these measured values from the server to the processing unit takes place after the server has received from the processing unit a corresponding inquiry together with the first certificate.

According to a further exemplary embodiment of the invention, the method furthermore comprises the following steps: conveying the certificate from the processing unit to the server; authenticating the processing unit based on the certificate; and determining the extent of the data that is subsequently to be conveyed from the server to the processing unit solely by means of the first certificate conveyed to the server, and thus the first data object assigned to the first certificate.

According to a further exemplary embodiment of the invention, the method comprises the provision of a first user interface for a user of the processing unit by the server for managing the individual user accounts, and the provision of a second user interface for a user of the processing unit by the server for managing the certificates.

Below, exemplary embodiments of the invention are described with reference to the figures.

DETAILED DESCRIPTION

The illustrations in the figures are diagrammatic and not to scale.

In the following description of the figures the same reference characters are used for identical or similar elements.

Figure 1:
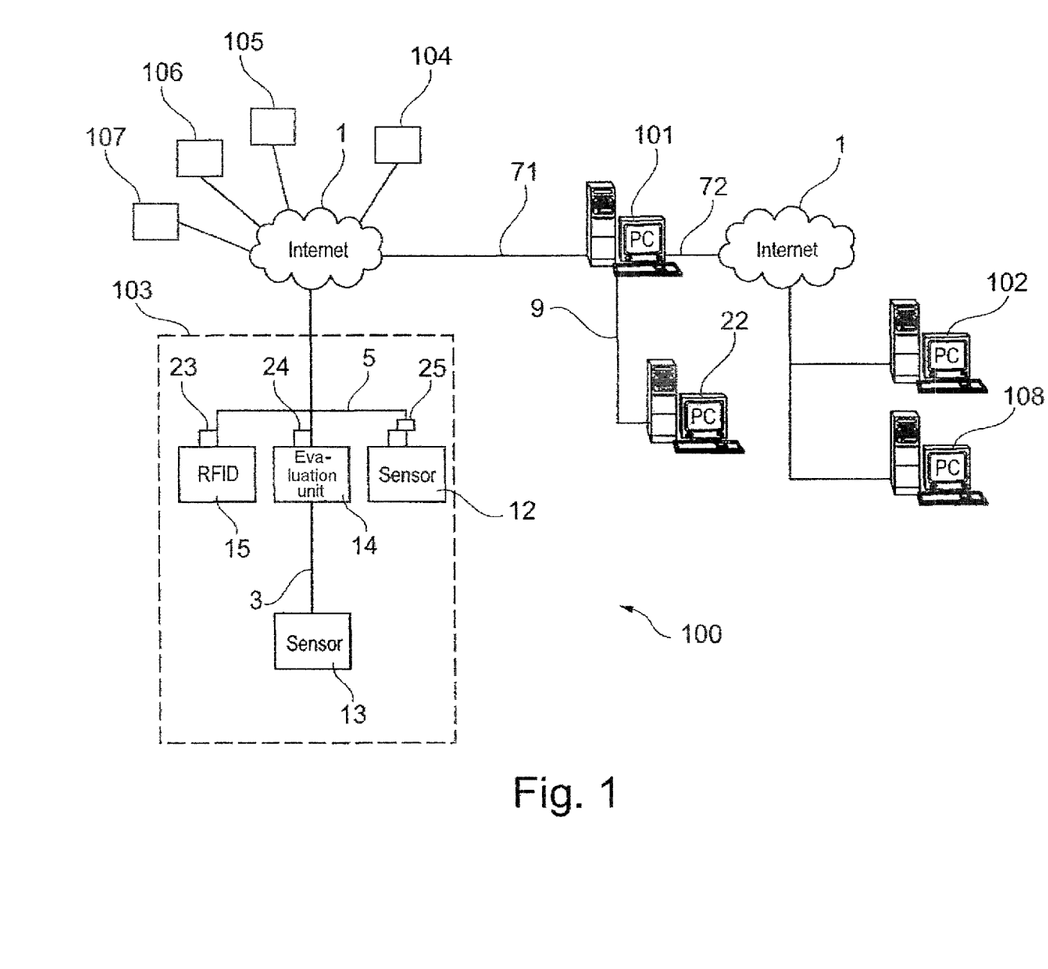
FIG. 1 shows an internet-based measurement value and diagnostic information polling system according to an exemplary embodiment of the present invention.

FIG. 1 shows an internet-based fill-level measurement value and diagnostic information polling system according to an exemplary embodiment of the invention. The system 100 comprises several field devices 103, 104, 105, 106, 107 (fill-level measuring devices, pressure measurement devices and/or flow measurement devices) which by way of the internet 1 and corresponding data lines (communication paths) 71 are connected to the server 101. Furthermore, several processing units 102, 108 are connected to the server 101, also by way of the internet 1 and corresponding data lines 72.

To this effect the field device 103 comprises sensors 13 (filling level sensors, flow measurement sensors or pressure sensors) that convey their measured values by way of a connection 3, optionally by means of a digital bus connection or as an analog 4 . . . 20 mA filling level signal to a higher-order evaluation unit 14. Furthermore, additional sensors 12 can be provided which do not communicate with the internet 1 by way of the evaluation unit 14. Moreover, identification sensors 15 (for example RFID sensors) can be provided for acquiring item data.

Assigned to the sensors 12, 15 or to the evaluation unit 14 are corresponding communication units 23, 24, 25 that are either directly integrated in the sensors 12, 15 or in the evaluation unit 14, or that communicate (in a cable-bound manner or wirelessly) with these devices by way of a corresponding transmission path.

By way of the internet 1 and a corresponding communication path 71 the measuring data of the field device 103 and of further field devices 103, 104, 105, 106, 107 are transmitted to the central server 101. The communication connection between the server 101 and the field devices 103, 104, 105, 106, 107 takes place in a bi-directional manner. It is thus possible to poll measured values in a targeted manner and to parameterize the individual devices in a targeted manner.

The server 101 comprises a web-VV server that is connected to the internet 1 by way of the communication path 71, 72. By way of the internet, data exchange can take place with web browsers distributed all over the world, which are installed on processing units 102, 108, for displaying measured values or for managing measured values.

Furthermore, a logistics tool 22 can be provided, for example in the form of a further processing unit with corresponding logistics software that can communicate (also in a cable-bound manner or wirelessly) with the server 101 by way of the data transmission path 9.

The system allows secure access to data of the measured-value server 101 by way of the internet in the fields of fill level measuring, pressure measuring and flow measuring.

The server 101 is, for example, a so-called WEB-VV server from the VEGA enterprise. The system operates globally and is able to convey the filling levels by way of the internet from any location in the world to the central server 101. For the purpose of displaying the data present on the server 101 an internet browser can be used. Another option consists of installing an application on the client computers 102, 108 and, when required, of starting this application on the corresponding client computer. Proprietary solutions can be used as a transmission protocol. Access control to information relating to measured values can take place by way of user accounts, or, as described above, by conveying a corresponding inquiry together with a corresponding certificate from the client computer 102, 108 to the server 101.

On the server 101 the measured values and the diagnostic-information polling data of a multitude of clients (and thus a multitude of field devices 103 to 107) are centrally administered in a database. Access by the client computers 102, 108 to the measured values of the server takes place, for example, by way of web services. In this process a special method is used in order to ensure that only authorized client computers can access the server 101, and that in this process only those measured values can be retrieved that have been released in relation to these client computers. The clients 102, 108 themselves display the received measured values and if applicable diagnostic information data by means of corresponding client software (e.g. a Microsoft Windows application or a Microsoft Windows 7 mini application) or they use the data for further processing in logistics applications. According to an exemplary embodiment, the system according to the invention can automatically retrieve the fill-level measurement data and diagnostic information data without assistance from a user, and can display said data or convey it for further processing.

The system provides a clear separation of the different subject areas of "user accounts" and "data release for client computers", as a result of which overall clarity is improved. Access control is secured by the issue of certificates which in each case are generated during preparation of the data objects and which are assigned to said data objects. The certificate is conveyed to an operator of the client computer. Only the holder of a certificate can obtain access to the data on the server, namely precisely to the data described in the assigned data object. The definition takes place centrally in one location, namely on the server, and is also managed on the server. For issuing the data this server only requires a single interface which by means of the certificate of the inquiring computer channels data access. In this manner the expenditure for testing and implementation on the server is kept low, while nevertheless maximum flexibility is ensured. There is a further advantage in that the use of certificates provides maximum protection against data misuse.

With internet-based access to the server, the well-known HTTP protocol can be used for data transmission. This may avoid the network administrator on the client side incurring configuration expenditure, because each computer that on the client side has internet access for browser use (e.g. internet Explorer) can automatically also use the web service.

Figure 5:
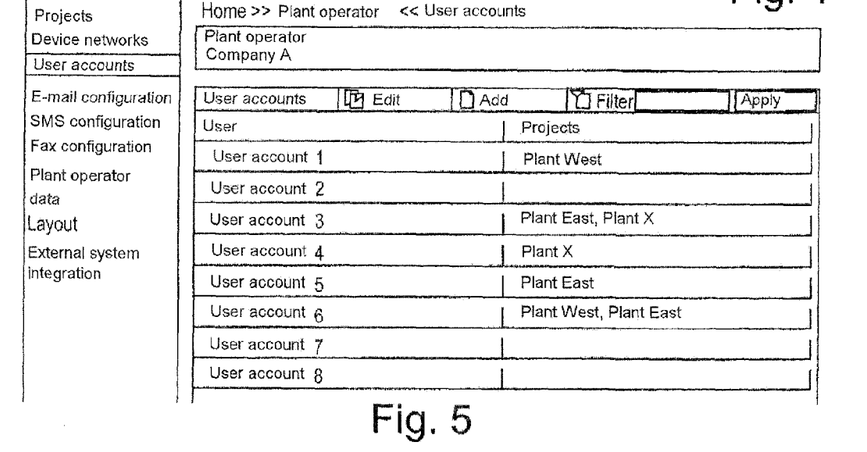
FIG. 5 shows a user interface for user account control.
Figure 6:
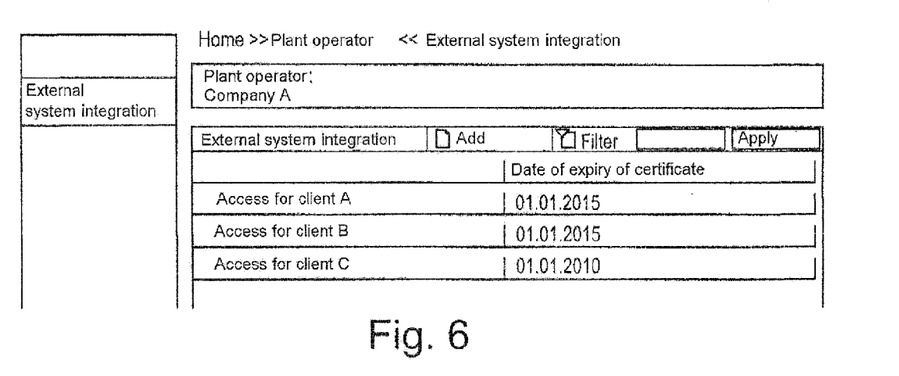
FIG. 6 shows a user interface for managing data releases for client computers according to an exemplary embodiment of the invention.

The individual steps towards using web services within this system are then as follows:

On the central server, apart from the user interface for managing user accounts, a second user interface for managing data releases to client computers is provided (see FIG. 5 and FIG. 6).

Figure 3:
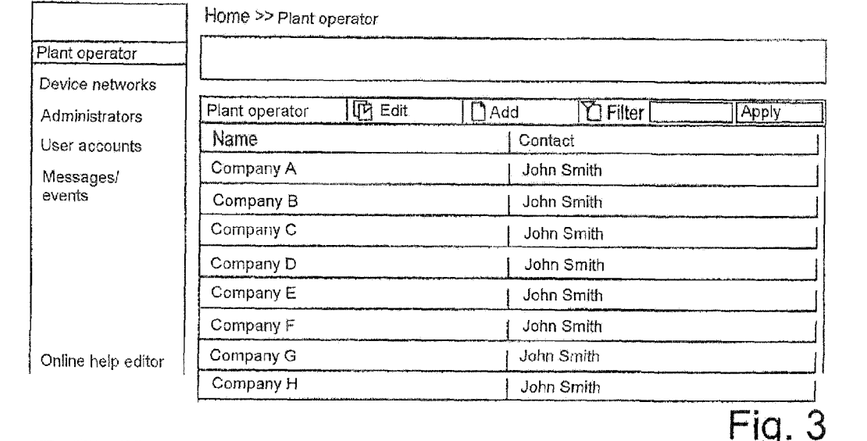
FIG. 3 shows a user interface for managing several clients (plant operators) on the server.
Figure 4:
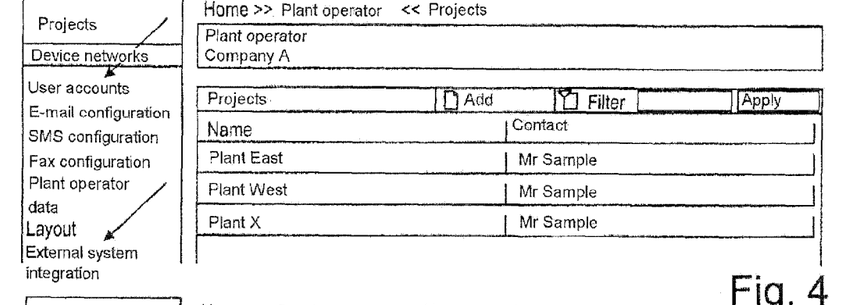
FIG. 4 shows a user interface for managing various projects which a client has defined for itself for better clarity.

FIG. 3 and FIG. 4 illustrate management of various clients (plant operators) and their projects (subdivisions). FIG. 3 shows a user interface for managing several clients (plant operators) on the server. The diagram shows that on the server data is managed that originates from various clients; this shows the importance of maintaining tidy access control. No client will ever be able to call up this user interface; it is accessible exclusively to the administrator (in other words the operator of the server).

FIG. 4 shows a user interface for managing various projects which a client has defined for improved clarity. The distribution of the multitude of measuring points to various projects makes it possible for the client to organize measuring points that belong together to form sub-structures.

In this manner it is thus possible to open the user interface in a targeted manner for user account management (see FIG. 5), or to open the user interface for data release to client computers (see FIG. 6).

Figure 7:
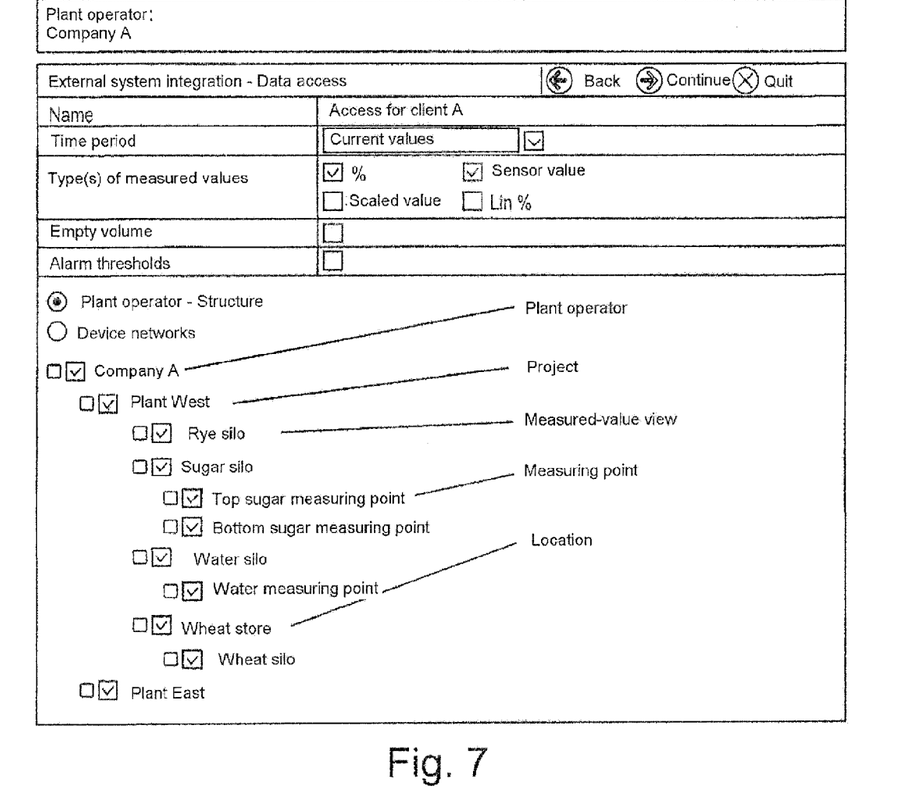
FIG. 7 shows a graphic tool for selecting desired measuring points for data release according to an exemplary embodiment of the invention.

By way of graphic tools the user interface for data release to client computers provides a clear option for selecting desired measuring points (field devices) for data release (see FIG. 7). Each defined data set for release to client computers is managed in a clearly arranged manner in a list. Apart from the actual definition of the assigned measuring points, at the same time a certificate relating to the prepared data object is generated and assigned to said data object.

Figure 8:
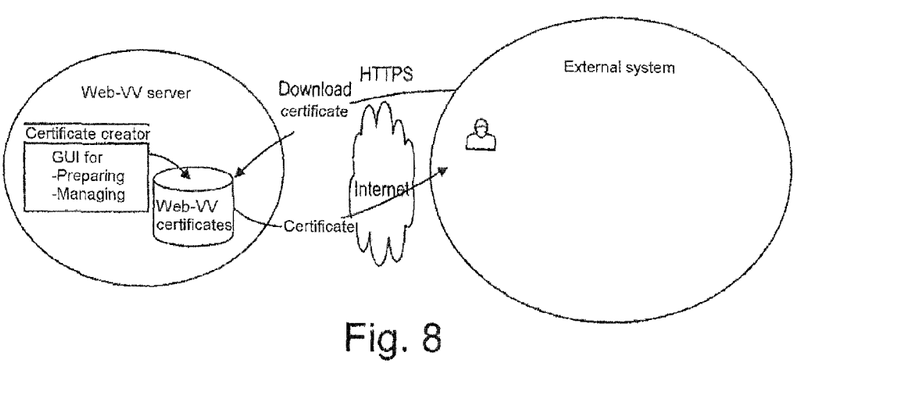
FIG. 8 shows the conveyance of a certificate to a client computer according to an exemplary embodiment of the invention.
Figure 9:
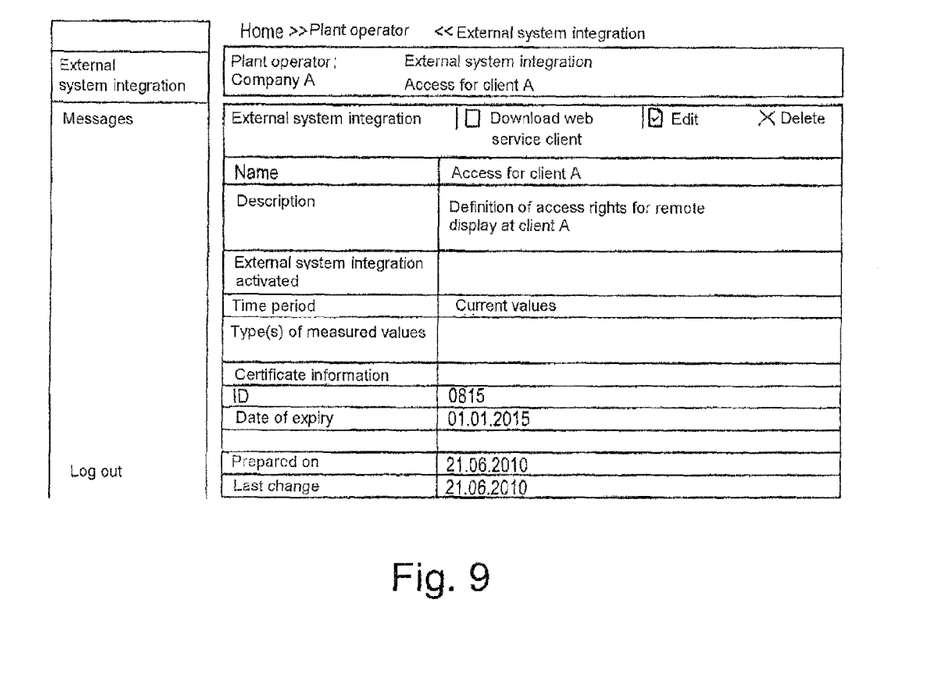
FIG. 9 shows a user interface as well as the downloading, on the side of the user, of a certificate according to an exemplary embodiment of the invention.
Figure 10:
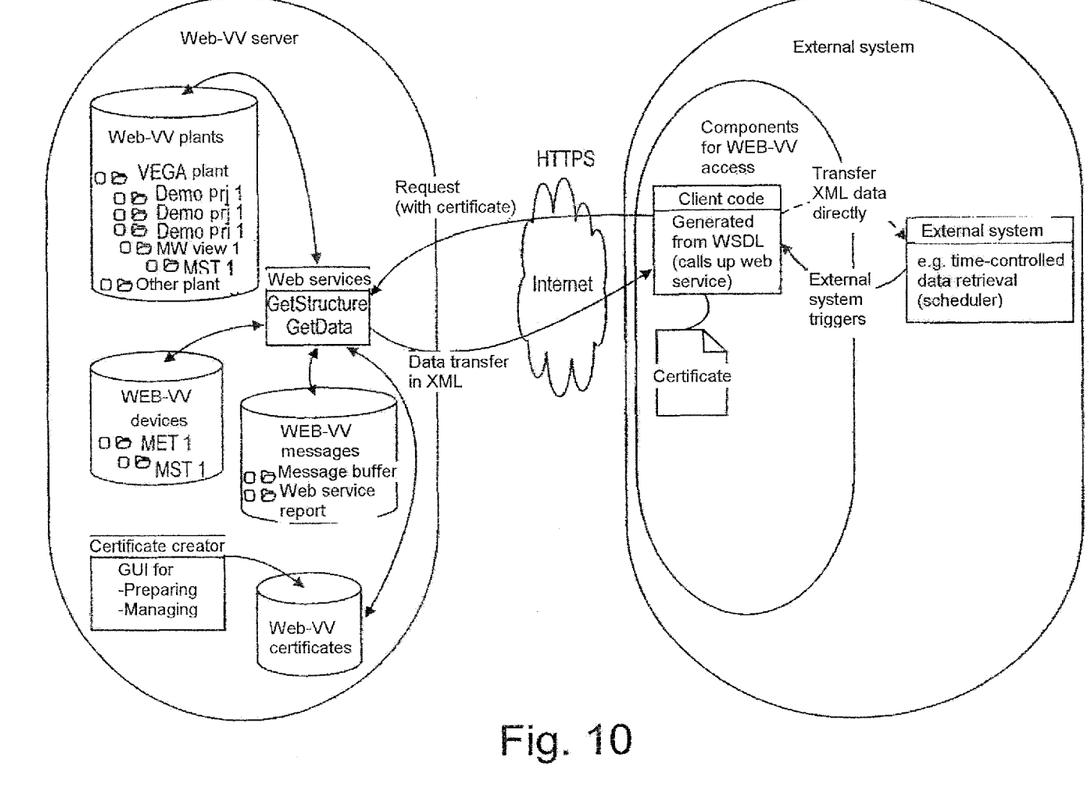
FIG. 10 shows a further system according to an exemplary embodiment of the invention.

The certificate is conveyed to the operator of the client computer, or the operator himself downloads the certificate if said operator has been entered as a user of Web-VV (see FIGS. 8 and 9). Together with the certificate the operator receives the client code appropriate to the web server as a WSDL file or as a finished demo client. The WSDL file provides the operator with the option of integrating the web service in a platform-independent manner in his target environment (see FIG. 10).

With the demo client the user has the option of immediate use, for example with the operating system MS Windows. For example, a Microsoft Windows 7 mini application for display of precisely one measuring point with alarm status can be used as a demo client. It is merely necessary to issue a certificate to the respective user for his desired measuring point.

Only the holders of a certificate may obtain access to the data on the server, namely precisely to the data which is described in the assigned data object. Thus there may be no need, at the client computers, to carry out any additional adaptation relating to data access. It is solely the certificate obtained that determines the maximum extent of the data released for conveyance. Of course, users in their request can also define that they wish to access a subset of this maximally released quantity of data. In this case only this subset is conveyed to the client computer 102 or 108.

The definition of the access computers takes place centrally at one location, for example on the server, where it is also managed. For release of the data the server only requires a single interface which by means of the certificate from the inquiring computer channels data access. Thus the expenditure for testing and implementation on the server is kept low, while nevertheless maximum flexibility is ensured.

Figure 2:
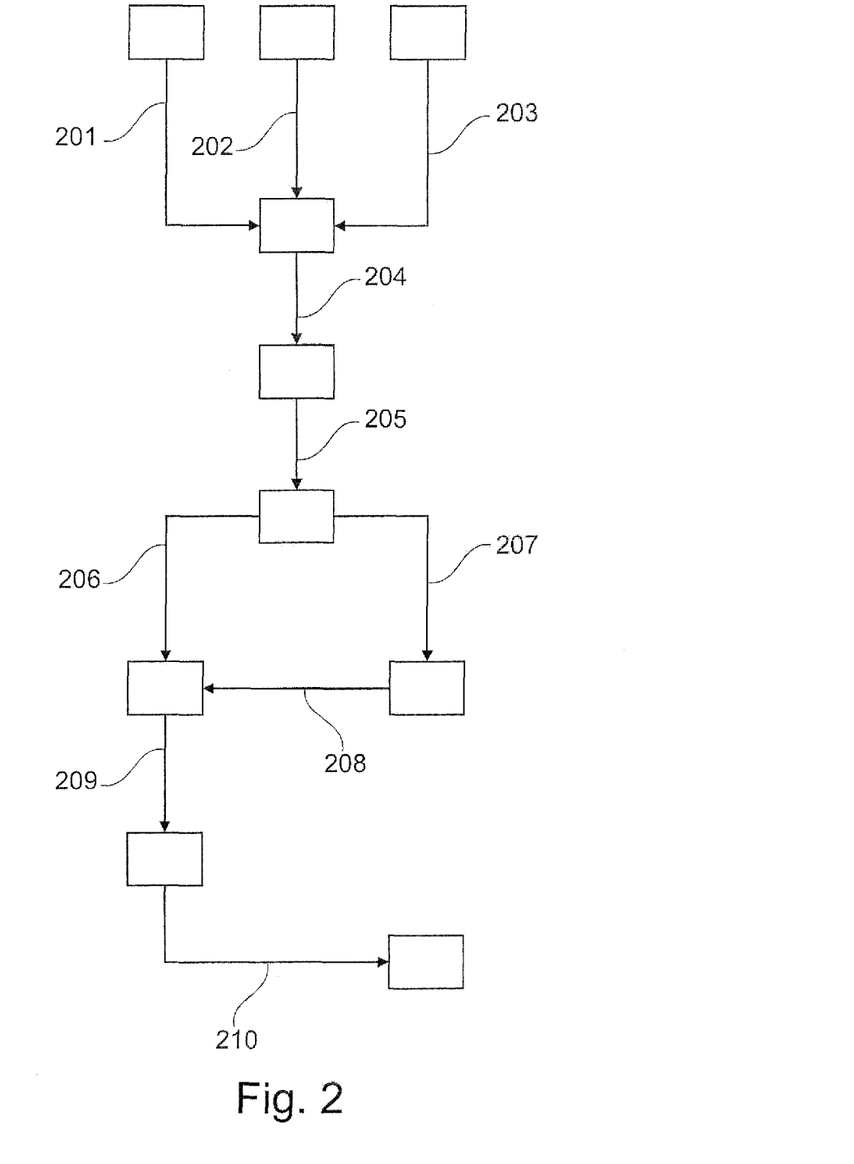
FIG. 2 shows a method according to an exemplary embodiment of the invention.

FIG. 2 shows a flow chart of a method according to an exemplary embodiment of the invention. In steps 201, 202 and 203 measured data and/or diagnostic information data is conveyed from the individual field devices to the central server. In step 204 a user inquiry to the server takes place with a request to prepare a certificate. This inquiry can take place via the internet. In this process it is important for authentication of the user to take place; in other words, it is determined on the server side whether this user is authorized to receive a certificate.

Subsequently in step 205 the corresponding certificate and a related data object are generated. This data object defines all the data that may be provided to the user following a corresponding inquiry (provided the user also conveys the certificate with this inquiry).

In step 206 the data object is stored in the server, and in step 207 the certificate is conveyed to the user (in other words, for example, to the processing unit 102 which is connected to the server by way of the internet). In step 208 an inquiry from the user to the server takes place, with the request of providing defined measured data to the user. Together with this inquiry the certificate is conveyed to the server. In step 209 authentication of the user takes place by checking the certificate, as does identification of the data on the server, which data belongs to the data object assigned to the certificate. Furthermore, the server identifies the data requested by the user and checks whether this data is indeed covered by the data object, in other words whether this data can be provided to the user. If both authentication and this data check have been successful, in step 210 the requested data is conveyed to the user.

In addition, it should be pointed out that "comprising" does not exclude other elements or steps, and "a" or "one" does not exclude a plural number. Furthermore, it should be pointed out that characteristics or steps which have been described with reference to one of the above exemplary embodiments can also be used in combination with other characteristics or steps of other exemplary embodiments described above. Reference characters in the claims are not to be interpreted as limitations.

The invention claimed is:

1. An Internet-based fill-level measurement value and diagnostic information polling system, comprising:
a server;
a first field device providing first measured values to the server, the first field device communicatively connected with the server;
a processing unit polling the first measured values from the server, the processing unit communicatively connected with the server via the Internet;
wherein the system generates a first certificate and a first data object which is related to the first certificate upon receipt of an inquiry from the processing unit;
wherein the first data object allows the server to identify the first measured values of the first field device as being related to the first certificate;
wherein the server automatic transmitting, to the processing unit, of the first measured values related to the first certificate if the server receives a corresponding inquiry together with the first certificate from the processing unit.

2. The system according to claim 1, further comprising:
a second field device transmitting second measured values to the server, the second field device communicatively connected with the server;
wherein the system generates a second certificate and a second data object, which is related to the second certificate, upon receipt of an inquiry from the processing unit;
wherein the second data object allows the server to identify the second measured values of the second field device as being related to the second certificate;
wherein the server automatic transmitting, to the processing unit, of the second measured values related to the second certificate when it receives a corresponding inquiry together with the second certificate from the processing unit.

3. The system according to claim 1, wherein the server generates the first certificate and the first data object following a request by the processing unit.

4. The system according to claim 1, wherein the server manages the first certificate.

5. The system according to claim 1, wherein the server manages individual user accounts by way of which the processing unit carries out parameterization of the first field device.

6. The system according to claim 5, wherein the server provides a first user interface for a user of the processing unit in order to manage the individual user accounts; and wherein the server provides a second user interface for a user of the processing unit in order to manage the certificates.

7. The system according to claim 1, wherein extent of the data which is subsequently to be transmitted from the server to the processing unit is determined solely based the first data object related to the first certificate received from the processing unit in the server.

8. The system according to one of claim 7, wherein the first field device is a fill-level measuring device; and wherein the data includes at least one of fill-level measurement data and diagnostic data.

9. The system according to claim 1, wherein the first data object furthermore allows the server to identify diagnostic data of the first field device as being assigned to the first certificate.

10. A method for using an Internet-based fill-level measurement value and diagnostic information polling system, comprising the steps of:
    transmitting first measured values from a first field device to a server;
    generating a first certificate and a first data object related to the first certificate upon receipt of an inquiry from a processing unit;
    using the first data object, identifying the first measured values of the first field device as being related to the first certificate; and
    automatically transmitting from the server to the processing unit the first measured values that are related to the first certificate when the server receives a corresponding inquiry and the first certificate from the processing unit.

11. The method according to claim 10, further comprising the steps of:
    transmitting the certificate from the processing unit to the server;
    authenticating the processing unit based on the certificate;
    determining the extent of the data that is subsequently to be transmitted from the server to the processing unit solely using the first certificate transmitted to the server, and thus the first data object assigned to the first certificate.

12. The method according to claim 10, further comprising the steps of:
    providing a first user interface for a user of the processing unit by the server for managing the individual user accounts; and
    providing a second user interface for a user of the processing unit by the server for managing the certificates.

* * * * *